(12) United States Patent
Yoshimura et al.

(10) Patent No.: US 6,576,317 B2
(45) Date of Patent: Jun. 10, 2003

(54) OPTICAL DISC AND INJECTION COMPRESSION MOLDING DIE FOR PRODUCING THE SAME

(75) Inventors: Hideaki Yoshimura, Shizuoka (JP); Shinsuke Kishi, Saitama (JP)

(73) Assignee: Sony Corporation (JP)

( * ) Notice: Subject to any disclaimer, the term of this patent is extended or adjusted under 35 U.S.C. 154(b) by 23 days.

(21) Appl. No.: 09/774,701

(22) Filed: Feb. 1, 2001

(65) Prior Publication Data

US 2001/0019535 A1 Sep. 6, 2001

(30) Foreign Application Priority Data

Feb. 2, 2000 (JP) ........................................ 2000-024885

(51) Int. Cl.⁷ ................................................ B32B 3/02
(52) U.S. Cl. ................. 428/64.1; 428/64.4; 430/270.11
(58) Field of Search ............................... 428/64.1, 64.4, 428/913; 430/270.11, 495.1, 945; 369/283

(56) References Cited

U.S. PATENT DOCUMENTS 5,827,593 A * 10/1998 Maruyama ................ 428/64.1
5,997,976 A * 12/1999 Mueller ..................... 428/64.1
5,999,513 A * 12/1999 Arakawa .................... 369/282
2002/0114264 A1 * 8/2002 Kuchman ................ 369/275.3

* cited by examiner

*Primary Examiner*—Elizabeth Mulvaney
(74) *Attorney, Agent, or Firm*—Rader, Fishman & Grauer PLLC; Ronald P. Kananen, Esq.

(57) ABSTRACT

An optical disc capable of preventing damages on a printing plate and an injection compression molding die capable of producing such optical disc substrate without raising the accuracy of the die are provided. An optical disc substrate according to one embodiment of the present invention has a ring-formed projected portion on the outer periphery of the printable plane slightly recessed inwardly from the outer edge of the disc. Such optical disc substrate can be produced using a molding die in which a readout-side mirror has a ring-formed groove on the inner surface thereof in the vicinity of a sliding portion between such readout-side mirror and a cavity ring.

10 Claims, 10 Drawing Sheets

OPTICAL DISC AND INJECTION COMPRESSION MOLDING DIE FOR PRODUCING THE SAME

BACKGROUND OF THE INVENTION

1. Field of the Invention

The present invention relates to an improvement in an optical disc and an injection compression molding die for producing an optical disc substrate for the optical disc, and in particular to an optical disc that does not cause damages on a printing plate during screen printing on a printable plane of such disc, and an injection compression molding die for producing a substrate for such disc.

2. Description of the Related Art

Molding of a thin disc for lamination, such as that being used for DVD (Digital Versatile Disc), is generally carried out by the injection compression molding method in order to satisfy standards on birefringence or skew. A conventional die used for such injection compression molding will be explained referring to FIGS. 8 to 9.

FIG. 8 is a partial sectional view showing a tightened state of a conventional injection compression molding die for producing an optical disc substrate, FIG. 9 is a partial sectional view showing a tightened state of another conventional die used for such injection compression molding for producing an optical disc substrate, and FIG. 10 is a partial sectional view showing a structure of an optical disc using a substrate produced by the injection compression molding die shown in FIGS. 8 and 9.

First, a constitution and structure of the injection compression molding die 10 shown in FIG. 8 will be described. The injection compression molding die 10 mainly comprises a fixed-side die 1010 composed of a mounting plate 1011 and a signal-side mirror 1012 mounted thereon, and a mobile-side die 1020 composed of a mounting plate 1021 and a readout-side mirror 1022 mounted thereon. The mounting plate 1011, the signal-side mirror 1012, the readout-side mirror 1022 and the mounting plate 1021 are arranged in a concentric manner. On an outer periphery of the signal-side mirror 1012, a fixed-side interlock ring 1030 is located so as to be mounted on the mounting plate 1011. To such fixed-side interlock ring 1030, a cavity ring 1040 is joined and attached so as to allow free sliding on the outer peripheral plane of the readout-side mirror 1022, while being constantly pressed toward such readout-side mirror 1022 by means of a spring not shown in the figure. A sprue bush 1050 is located at the center hole of the fixed-side die 1010, and opposing to the sprue bush 1050, a punch 1060 is located at the center hole of the mobile-side die 1020. Now reference numerals 1013, 1051, 1023 and 1061 denote temperature controlling circuits for the signal-side mirror 1012, the sprue bush 1050, the readout-side mirror 1022 and the punch 1060, respectively; a reference numeral 1024 denotes a degassing hole; and a reference numeral 1062 denotes a thrusting member.

The conventional injection compression molding die 20 shown in FIG. 9 mainly comprises a fixed-side die 2010 composed of a mounting plate 2011 and a signal-side mirror 2012 mounted thereon, and a mobile-side die 2020 composed of a mounting plate 2021 and a readout-side mirror 2022 mounted thereon, in the similar manner as the injection compression molding die 10. On an outer periphery of the signal-side mirror 2012, a cavity ring 2040 engaging with a conical plane formed on the outer periphery of the readout-side mirror 2022 is joined and attached while being constantly pressed toward such readout-side mirror 2022 by means of a spring not shown in the figure. A reference numeral 2030 denotes a fixed-side interlock ring. A sprue bush 2050 is located at the center hole of the fixed-side die 2010, and opposing to the sprue bush 2050, a punch 2060 is located at the center hole of the mobile-side die 2020. Now reference numerals 2013, 2051, 2023 and 2061 denote temperature controlling circuits for the signal-side mirror 2012, the sprue bush 2050, the readout-side mirror 2022 and the punch 2060, respectively; and a reference numeral 2062 denotes a thrusting member.

When an optical disc substrate is molded using thus composed injection compression molding die 10 or 20, a stamper S is mounted on the signal-side mirror 1012 or 2012, a molten resin is injected from the sprue bushing 1050 or 2050 into a cavity C surrounded by the stamper S. the readout-side mirror 1022 or 2022 and the cavity ring 1040 or 2040, to effect compression molding. This produces an optical disc substrate which is used for an optical disc D, an enlarged view of which is partially shown in FIG. 10.

The optical disc substrate thus produced using the conventional injection compression molding die 10 or 20, however, has on the outer periphery thereof a burr B with a height less than 10 $\mu$m. This is because the readout-side mirror 1022 and the cavity ring 1040 are kept in slide contact in the injection compression molding die 10, or the readout-side mirror 2022 and the cavity ring 2040 are kept in engagement in the injection compression molding die 20. Depending on the structure of the die, the burr B may have a sharp-edged tip as shown in FIG. 10. The optical disc D having such burr B may undesirably make scratches on a printing plate P during screen printing on the printable plane of such optical disc D, which significantly reduces the service life of the printing plate P, and requires frequent exchange thereof. Alternatively, removal of the burr B before printing is required, which will however degrade the yield and thus push up the product cost of the optical disc.

An approach to reduce generation of the burr B requires an extremely high level of accuracy of the die structure, which will undesirably push up the production and maintenance costs of the die and significantly worsen the operation ratio of a molding machine.

SUMMARY OF THE INVENTION

To solve the foregoing problem, it is therefore an object of the present invention to provide an optical disc capable of preventing scratches from being produced on the printing plate with no special need of raising accuracy of the die, and to provide an injection compression molding die for producing such a disc substrate.

Hence a first aspect of the invention solves the foregoing problem by forming a ring-formed projected portion on an outer periphery of a printable plane of an optical disc.

In a second aspect of the present invention, the projected portion of the optical disc as described above has a continuous form.

In a third aspect of the present invention, the projected portion of the optical disc as described in the first aspect has a height of 10 $\mu$m to 50 $\mu$m.

In a fourth aspect of the present invention, the projected portion of the optical disc of the first or the second aspect of the present invention is formed in the inside and/or outside vicinity of a ring-formed burr generated on the outer periphery of the disc.

In a fifth aspect of the present invention, a ring-formed recessed portion formed on the outer periphery of the printable plane of the optical disc is formed so as to house a ring-formed burr.

Moreover, in a sixth aspect of the present invention, the foregoing problem is solved by an injection compression molding die which comprises a signal-side mirror; a readout-side mirror; a cavity ring joined to the signal-side mirror, and sliding on or being engaged with an outer periphery of the readout-side mirror; a sprue bush located at the center of the signal-side mirror; and a punch located at the center of the readout-side mirror; in which a molten resin is injected from the sprue bush into a cavity surrounded by a stamper mounted on the surface of the signal-side mirror, the surface of the readout-side mirror and an inner peripheral plane of the cavity ring, and compressed to be transferred with pits from the stamper, and is punched out by the punch to form a center hole of an optical disc substrate; wherein the surface of the readout-mirror and/or the inner peripheral plane of the cavity ring has a ring-formed recessed groove in an area around where the readout-mirror and the cavity ring come into proximity.

According to the optical disc of the first aspect of the invention, the printing plate P can be raised upward by means of the ring-formed projected portion.

According to the optical disc of the second aspect of the invention, warping of the disc can be prevented, which is an operation additional to those expected from the optical disc of the first aspect.

According to the optical disc of the fourth aspect of the invention, operations equivalent to those of the first and the second aspects will be obtained.

According to the optical disc of the fifth aspect of the invention, the burr is prevented from being brought into contact with the printing plate P owing to the ring-formed projected portion.

Moreover, according to the injection compression molding die of the sixth aspect of the invention, the printing plate P will successfully be prevented from being damaged without upgrading the accuracy of the die constitution.

As has been described in the above, the present invention can provide an optical disc substrate not causative of damages on the printing plate. This will successfully result in:

1. longer service life of the printing plate, and reduction in the number of production of the printing plate;
2. reduction in time for exchanging the printing plate, and reduction in the number of process steps for checking thereof before and after the exchange;
3. reduction in the molding downtime for exchanging the printing plate; and
4. reduction in disposal shot before and after the exchange of the printing plate.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENT

The optical disc and the injection compression molding die for a substrate of the optical disc of the present invention will be explained hereinafter referring to FIGS. 1 to 7.

Figure 8:
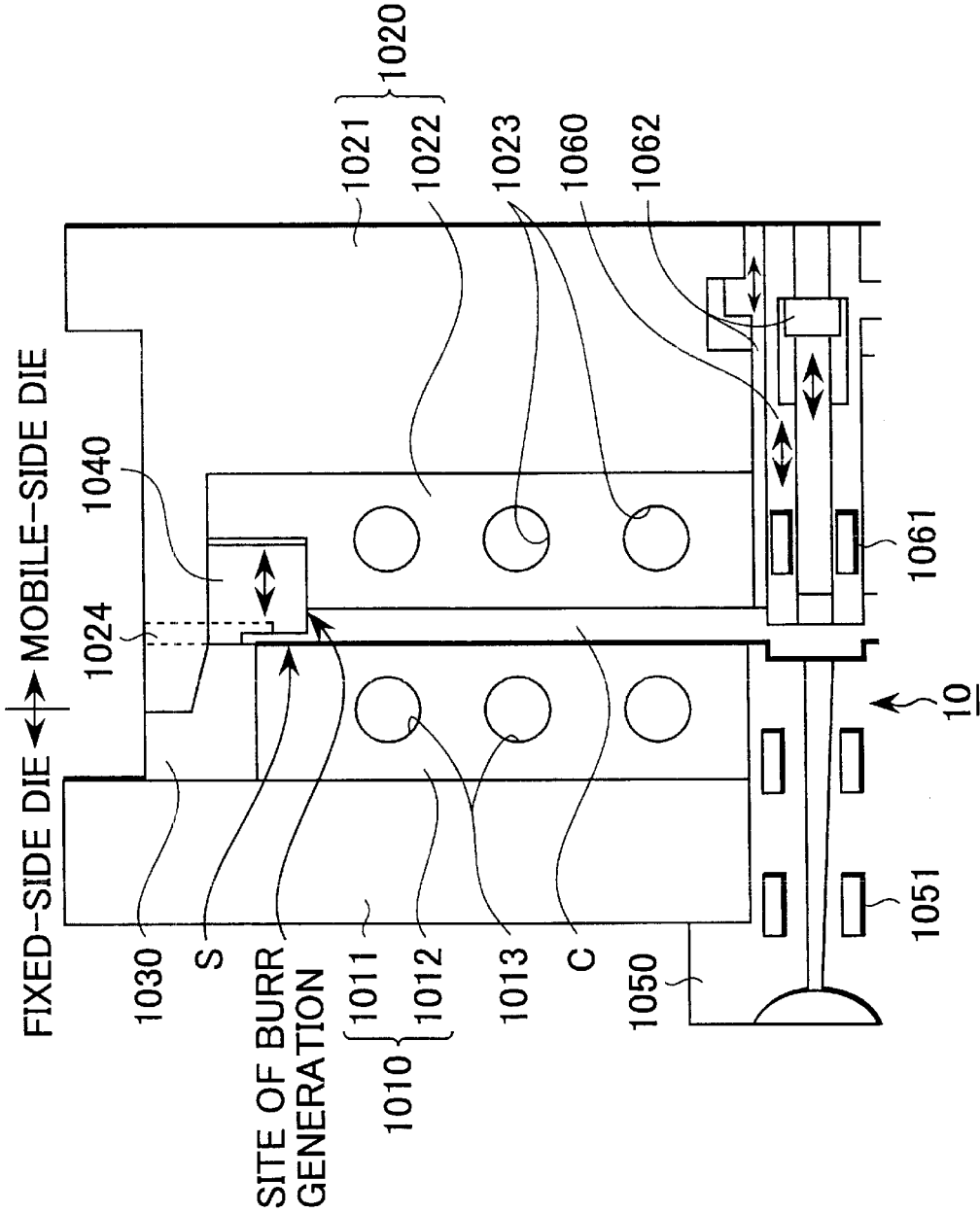
FIG. 8 is sectional view showing a tightened state of a conventional injection compression molding die for producing optical disc substrates.

First, a constitution and structure of an injection compression molding die and an optical disc formed with a substrate produced using thereof according to a first embodiment of the present invention will be described referring to FIGS. 1 to 4. It is now to be noted that the explanation of a first embodiments below typically deals with an injection compression molding die shown in FIG. 8 in which the cavity ring 1040 is in slide-contact with the readout-side mirror 1022, and components same as those appeared in FIG. 8 will be explained using the same reference numerals.

Figure 1:
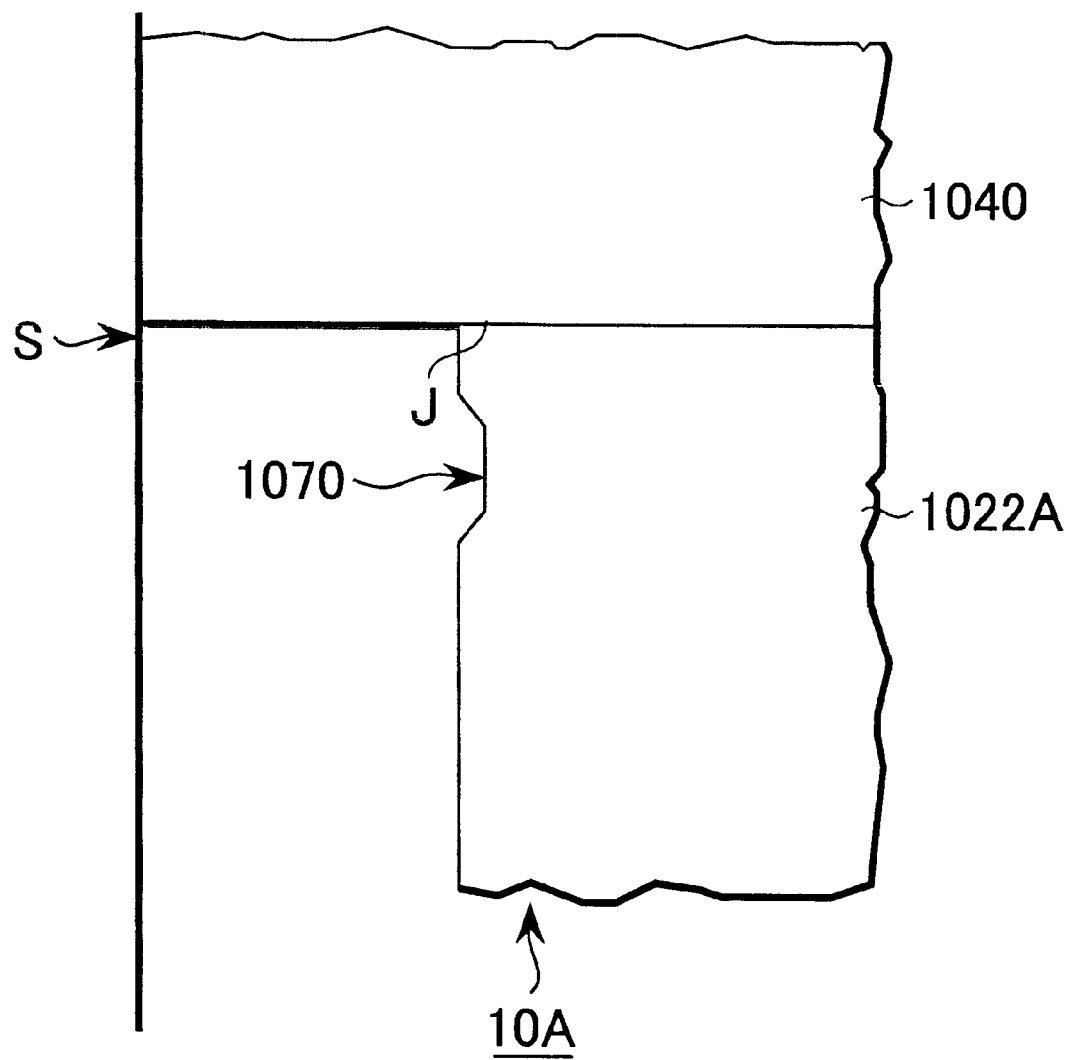
FIG. 1 is a sectional view showing a part of a readout-side mirror and a cavity ring of an injection compression molding die according to a first embodiment of the present invention.

In FIG. 1, a reference numeral 10A denotes an injection compression molding die according to the first embodiment of the present invention, and a reference numeral 1022A denotes a readout-side mirror thereof. A structural feature of the readout-side mirror 1022A resides in that having a ring-formed groove 1070 on the surface in an inside vicinity of a sliding portion J with the cavity ring 1040.

Figure 2:
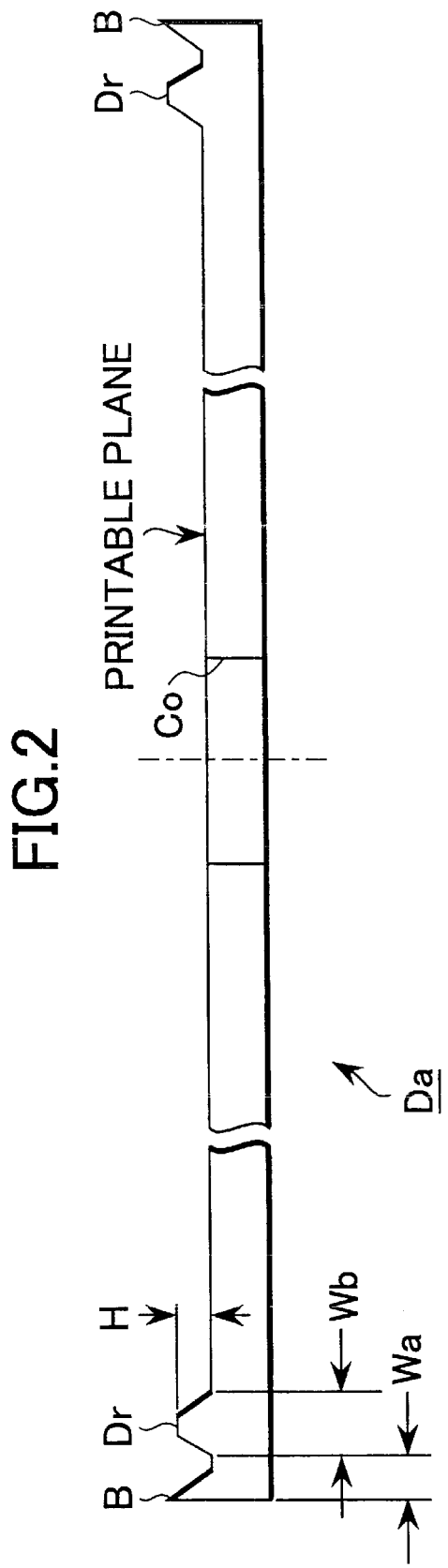
FIG. 2 is a sectional view showing an optical disc formed with a substrate, produced using the injection compression molding die shown in FIG. 1, according to one embodiment of the present invention.
Figure 3:
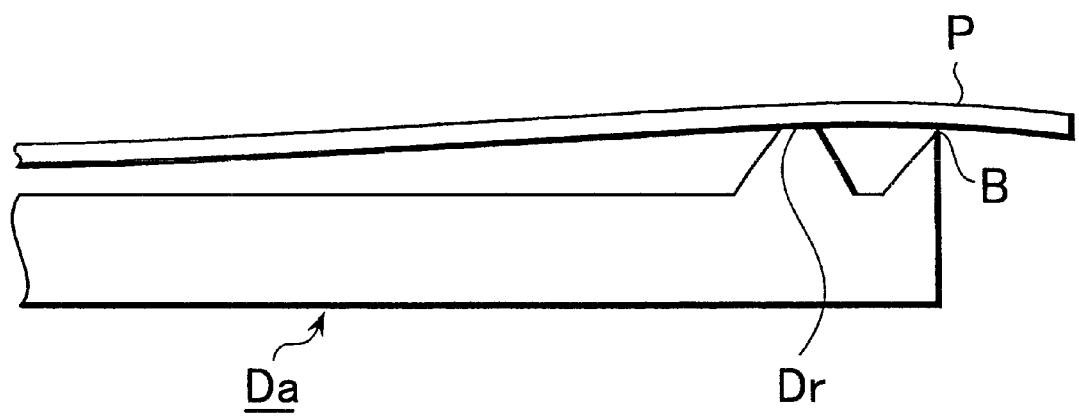
FIG. 3 is a partial sectional view showing a positional relation between the optical disc shown in FIG. 2 and the printing plate.

Injection compression molding using the injection compression molding die 10A employing the readout-side mirror 1022A will produce an optical disc as shown in FIG. 2. An Al layer is formed on a signal plane side of the substrate and a protection layer is formed on the Al layer so as to have an optical disc. That is, the disc will have a center hole Co opened with a punch 2060, and a ring-formed projected portion Dr on a printable plane in the inside vicinity of a burr B formed on an outer periphery.

For a case where the optical disc is a DVD, the projected portion Dr is inwardly recessed from an outer edge by a width Wa of 0.05 to 0.2 mm, has a width Wb of 0.05 to 0.2 mm, and has a height H of 0.01 to 0.05 mm. Too small width Wa may reduce the strength of the die. Too large sum of the width Wa and width Wb may cause adverse effects on signal readout or may reduce the printable area.

Providing such a projected portion Dr as described above is beneficial in screen printing on the printable plane of the optical disc Da, since a printing plate P placed on the printable plane of the optical disc Da will be elevated by the projected portion Dr in the vicinity of the burr B, so that the printing plate P will be less likely to be damaged by the burr B. In particular the projected portion Dr formed in a form of fully continuous ring will serve as a rim which can prevent warping of the disc per se.

The printable range on the printable plane of the disc is generally within 116 mm in diameter for a disc of 120 mm diameter, so that there will be no problem when the outer peripheral portion of the printing plate P is elevated by 50 $\mu$m at most by the projected portion Dr formed on the outer periphery inwardly recessed by approx. 0.5 mm from the disc edge. The projected portion Dr exceeding 50 $\mu$m in height will, however, inhibit contact between the printing plate P and the disc surface within the printable area, which will adversely affect the printing.

It is not always necessary to provide the projected portion Dr in a continuous ring form, and such that being fragmented at one point or a plurality of points to form a broken line pattern is also allowable. It is even not necessary that the individual fragments of the projected portion Dr are aligned in a ring. It is, however, essential that the fragments are aligned over the entire periphery of the optical disc D so as to keep a good weight balance, since the optical disc should be well balanced and rotated within a single plane without causing flapping.

Figure 4:
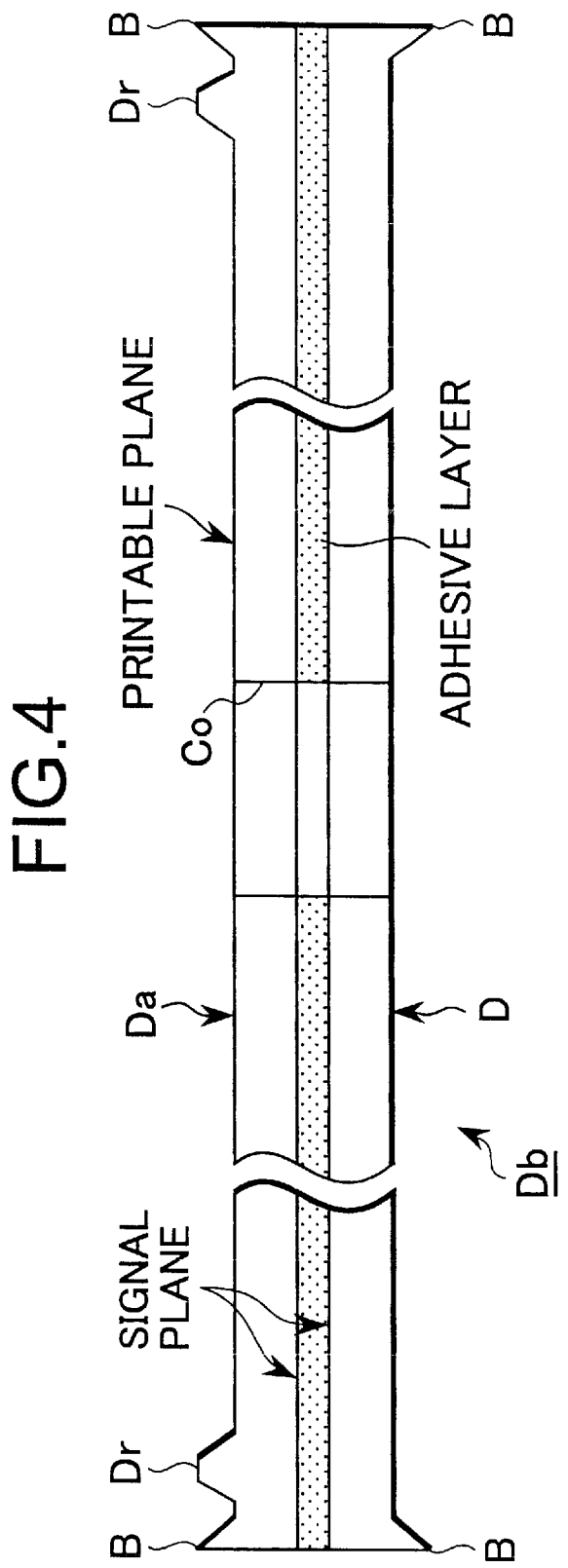
FIG. 4 is a sectional view showing a DVD using the optical disc of the present invention.

FIG. 4 shows a constitution of a laminated optical disc Db, typified by a DVD, which comprises the optical disc Da having the projected portion Dr formed thereon and an optical disc D having no projected portion Dr, where both substrates being adhered using an adhesive so that the signal planes thereof are opposed with each other. Also in the case of the optical disc Db, providing the projected portion Dr on the printable plane will successfully prevent the printing plate P from being damaged.

Figure 5:
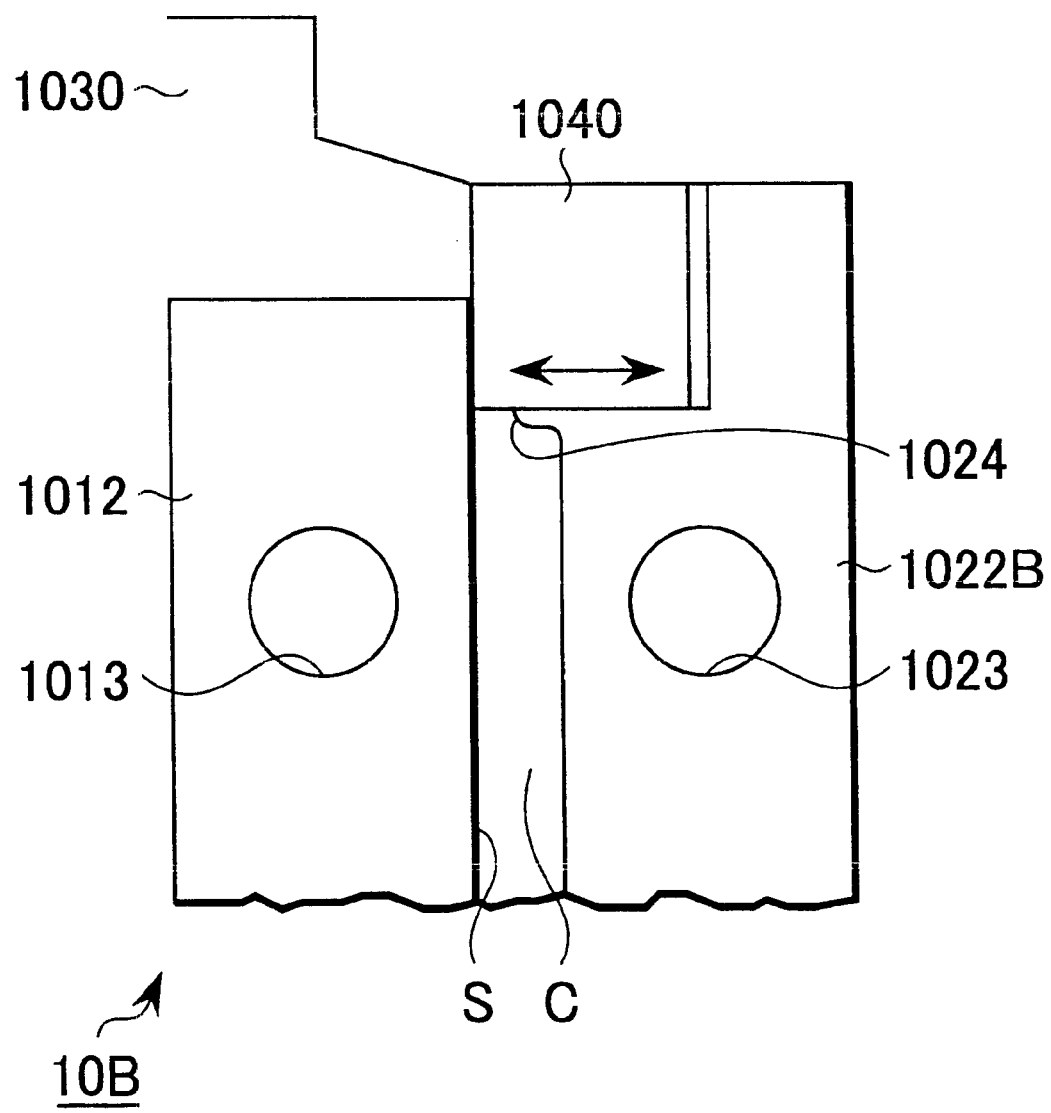
FIG. 5 is a sectional view showing a part of a readout-side mirror and a cavity ring of an injection compression molding die according to a second embodiment of the present invention.

FIG. 5 shows an injection compression molding die 10B according to a second embodiment of the present invention. The injection compression molding die 10B solves the foregoing problem by making the level of the outer periphery portion P of a readout-side mirror 1022B higher than that of the inner signal plane.

By composing the readout-mirror 1022B having such a structure, a molded optical disc substrate will have a larger thickness in the central portion than in the outer peripheral portion, and the level of the central portion will become higher than that of the burr B generated at the thin outer periphery portion, to thereby ensure an effect almost similar to that expectable from the ring-formed projected portion Dr.

Figure 6:
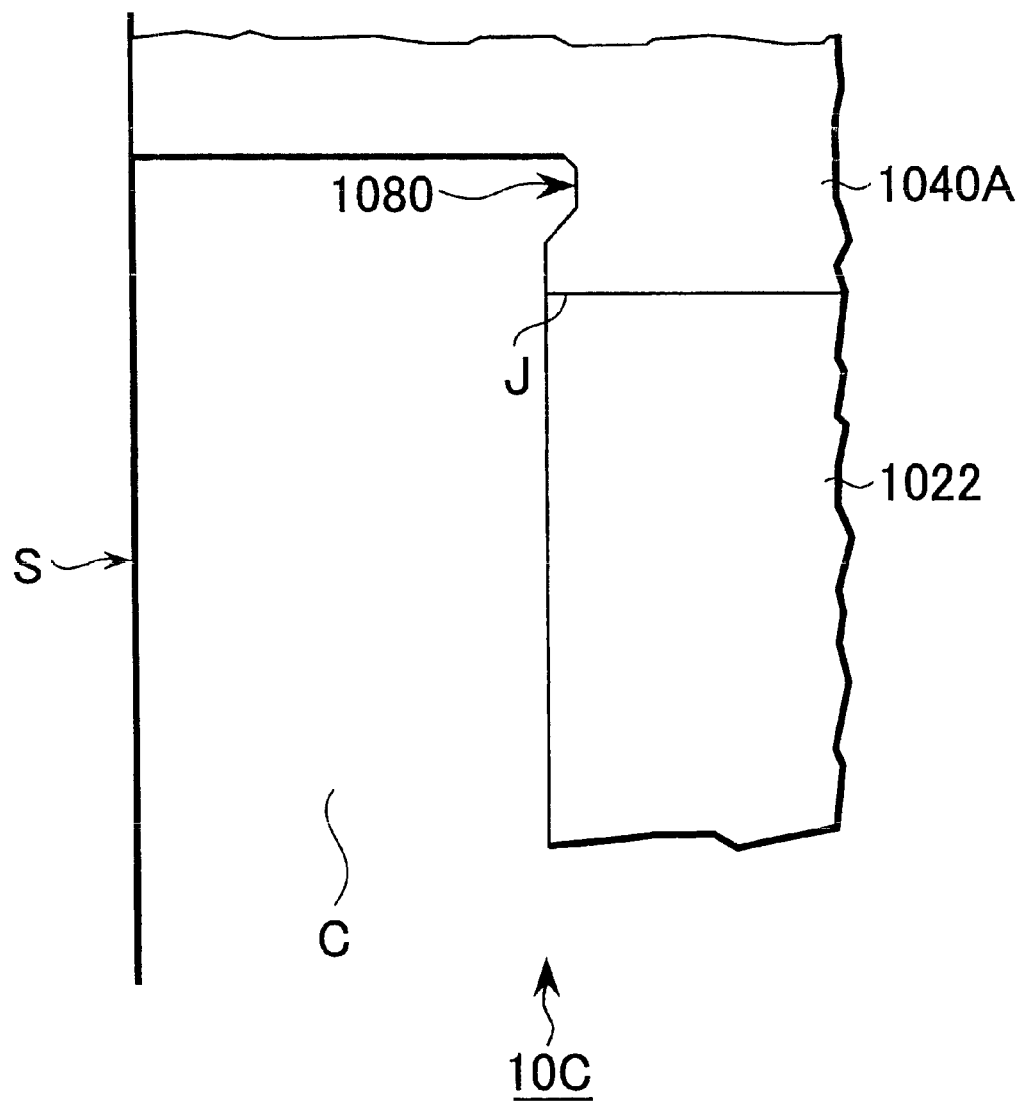
FIG. 6 is a sectional view showing a part of a readout-side mirror and a cavity ring of an injection compression molding die according to a third embodiment of the present invention.

FIG. 6 shows an injection compression molding die 10C according to a third embodiment of the present invention, in which a ring-formed groove 1080 is formed on an inner surface of a cavity ring 1040A in a vicinity of a sliding portion J. Injection compression molding using the cavity ring 1040A of such a structure will produce an optical disc substrate having the ring-formed projected portion Dr outside the burr B on the outer periphery. The projected portion Dr can also exhibit an effect almost similar to that expectable from the projected portion Dr obtained by using the injection compression molding die 10A of the above-described first embodiment.

Figure 7:
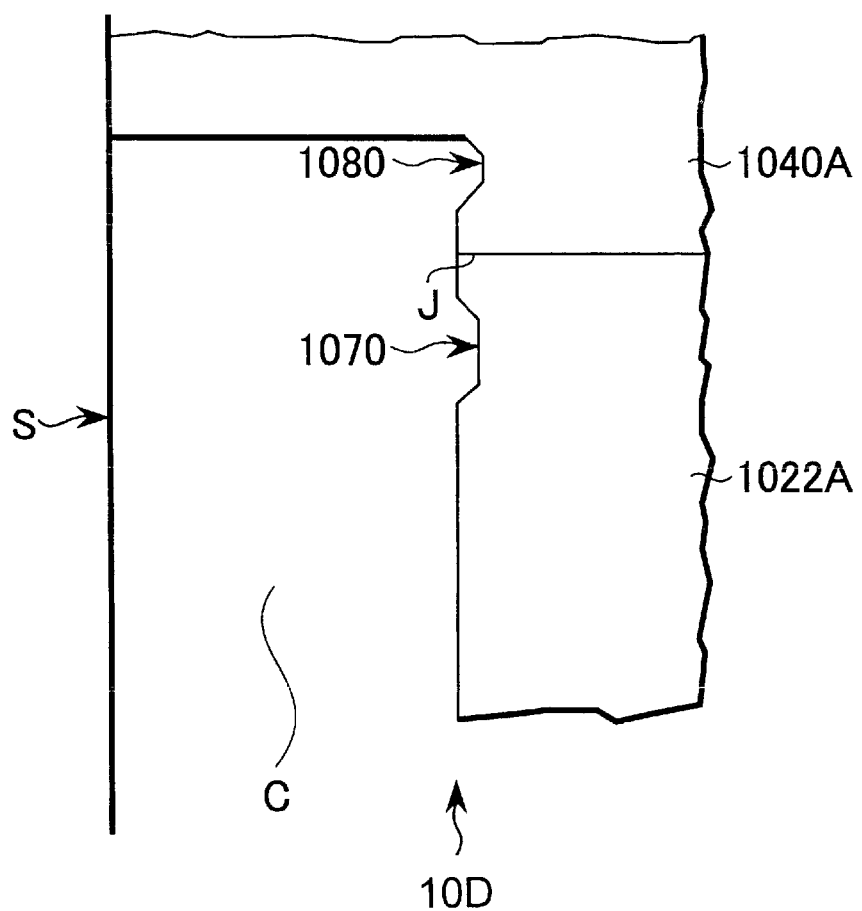
FIG. 7 is a sectional view showing a part of a readout-side mirror and a cavity ring of an injection compression molding die according to a fourth embodiment of the present invention.

FIG. 7 shows an injection compression molding die 10D according to a fourth embodiment of the present invention, which is designed based on a combination of the readout-side mirror 1022A of the injection compression molding die 10A shown in FIG. 1 and the cavity ring 1040A of the injection compression molding die 10C shown in FIG. 6, and has grooves 1070, 1080 individually on both sides of the sliding portion J of the readout-side mirror 1022A and the cavity ring 1040A.

Injection compression molding using such a mobile-side die will produce an optical disc substrate Da having individually on both sides of the burr B the ring-formed projected portions Dr slightly higher than the burr B. These projected portions Dr can also exhibit an effect almost similar to that expectable from the projected portion Dr obtained by using the injection compression molding die 10A of the above-described first embodiment.

Figure 9:
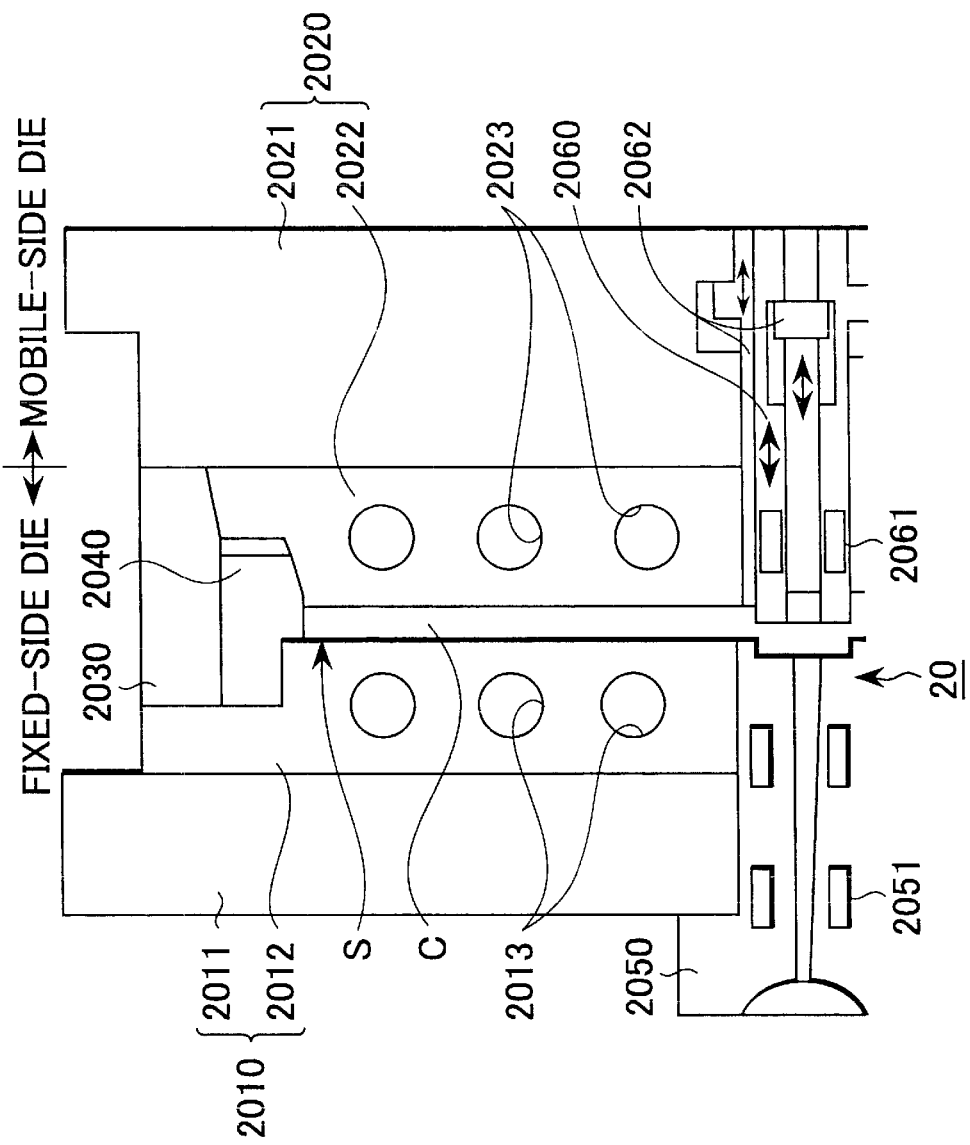
FIG. 9 is a sectional view showing a tightened state of another conventional injection compression molding die for producing optical disc substrates.
Figure 10:
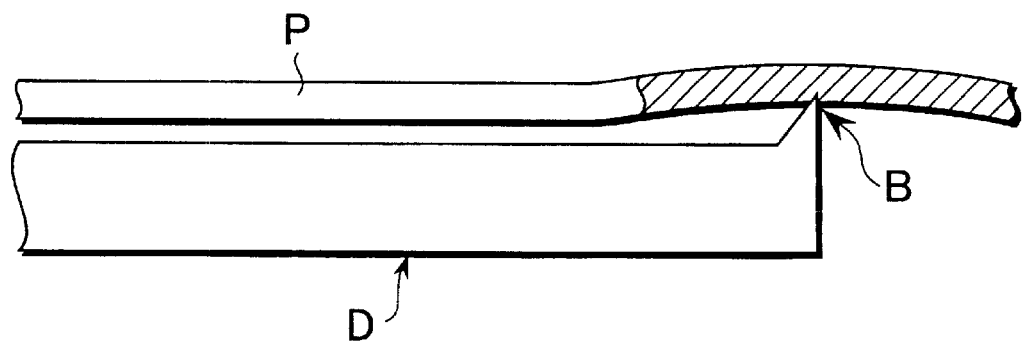
FIG. 10 is a partial sectional view showing a constitution of an optical disc formed with a substrate produced using the injection compression molding die shown in FIG. 8 or FIG. 9.

Although the invention has been described in its preferred form with a certain degree of particularity, obviously many changes and variations are possible therein. It is therefore to be understood that the present invention may be practiced otherwise than as specifically described herein without departing from the scope and the sprit thereof. For example, while the description on the above embodiments has been made on the injection compression molding dies shown in FIG. 8 in which the cavity ring 1040 is sliding on the outer periphery of the readout-side mirror 1022, it should be noted that the present invention is also applicable to the molding die shown in FIG. 9 in which the cavity ring 1040 is engaged with the outer periphery of the readout-side mirror 1022.

What is claimed is:

1. An optical disc having a ring-formed projected portion formed on an outer periphery of at least a printable plane thereof, wherein said projected portion is formed in an inside and/or an outside vicinity of a ring-formed burr generated on the outer periphery of said optical disc.

2. The optical disc as claimed in claim 1, wherein said projected portion has a continuous form.

3. The optical disc as claimed in claim 1, wherein said projected portion has a height of 10 $\mu$m to 50 $\mu$m.

4. An optical disc having a ring-formed projected portion formed on an outer periphery of at least a printable plane thereof, wherein said projected portion has a continuous form and wherein said projected portion is formed in an inside and/or an outside vicinity of a ring-formed burr generated on the outer periphery of said optical disc.

5. An optical disc having a ring-formed recessed portion formed on an outer periphery of at least a printable plane thereof so as to house a ring-formed burr.

6. An optical disc, comprising:
   a generally circular member defining a center hole and having a printable plane extending outwardly from said center hole on a first surface thereof;
   a ring-formed projected portion located at a distance from an outer periphery of said generally circular member and having a height sufficient to elevate a printing plate placed on the printable plane of the optical disc in the vicinity of any burr located at the rim of said disc when molded,
   wherein said projected portion is inwardly recessed from the outer periphery of said disc by a width Wa of 0.05 to 0.2 mm.

7. The optical disc as set forth in claim 6, wherein said projected portion is continuous.

8. An optical disc, comprising:
   a generally circular member defining a center hole and having a printable plane extending outwardly from said center hole on a first surface thereof; a ring-formed projected portion located at a distance from an outer periphery of said generally circular member and having a height sufficient to elevate a printing plate placed on the printable plane of the optical disc in the vicinity of any burr located at the rim of said disc when molded, wherein said projected portion has a width Wb of 0.05 to 0.2 mm.

9. An optical disc, comprising:

a generally circular member defining a center hole and having a printable plane extending outwardly from said center hole on a first surface thereof;

a ring-formed projected portion located at a distance from an outer periphery of said generally circular member and having a height sufficient to elevate a printing plate placed on the printable plane of the optical disc in the vicinity of any burr located at the rim of said disc when molded, further comprising a second generally circular member adhesively secured to said first generally circular member at a surface opposite said printable plane surface, said second generally circular member not having said projected portion.

10. The optical disc as set forth in claim 6, wherein said projected portion has a height H measured from said printable plane surface of 0.01 to 0.05 mm.

* * * * *

UNITED STATES PATENT AND TRADEMARK OFFICE
CERTIFICATE OF CORRECTION

PATENT NO.    : 6,576,317 B2
DATED         : June 10, 2003
INVENTOR(S)   : Hideaki Yoshimura et al.

It is certified that error appears in the above-identified patent and that said Letters Patent is hereby corrected as shown below:

<u>Column 8,</u>
Line 9, replace "set forth in claim 6," with -- set forth in any one of claims 6, 8 and 9 --.

Signed and Sealed this

Ninth Day of December, 2003

JAMES E. ROGAN
*Director of the United States Patent and Trademark Office*